Aug. 4, 1931.  J. E. MORGAN  1,817,093
FLEXIBLE TROLLEY
Filed Oct. 14, 1929   2 Sheets-Sheet 1
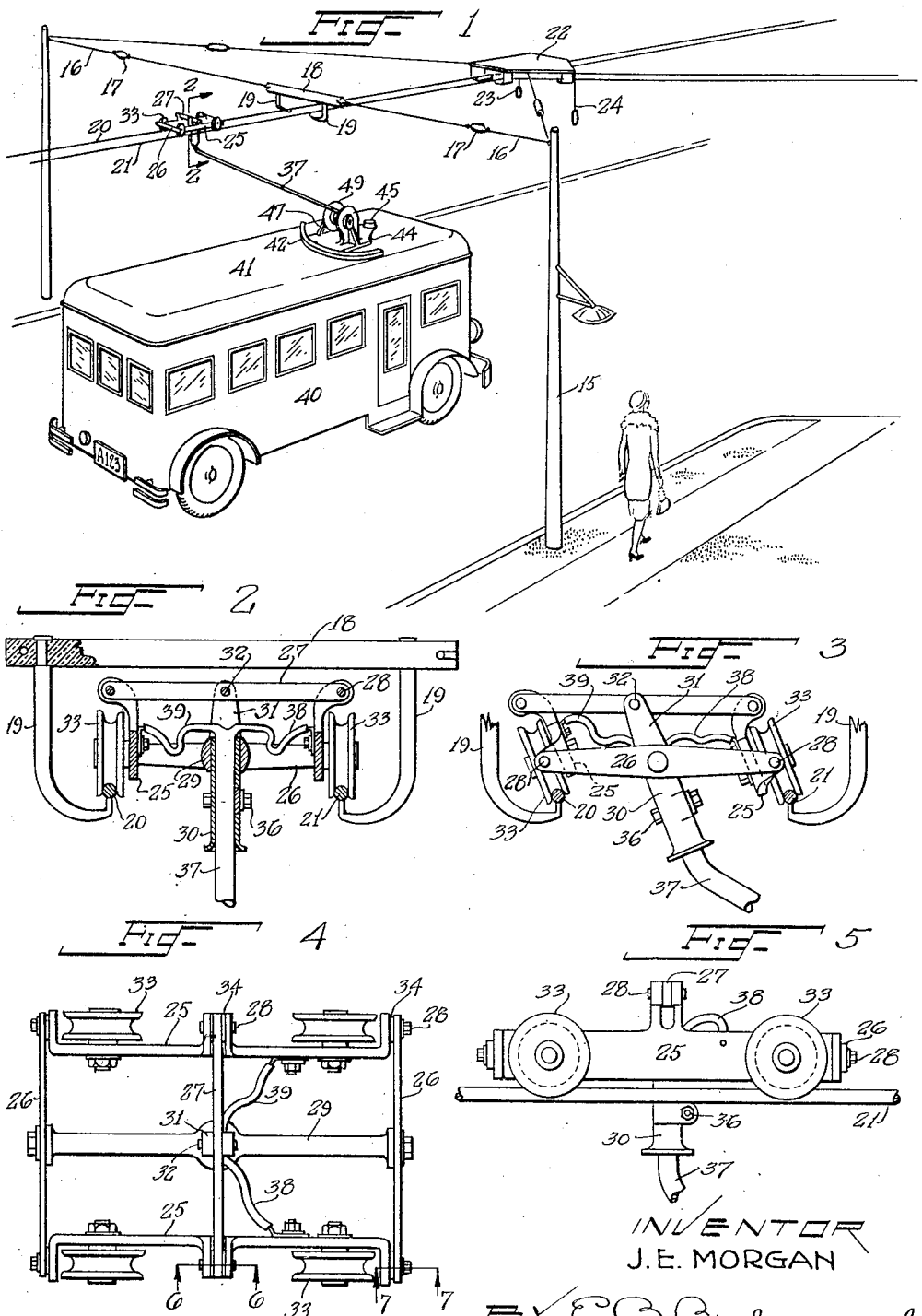
INVENTOR
J. E. MORGAN
BY C. B. Birkenbuel
ATTORNEY

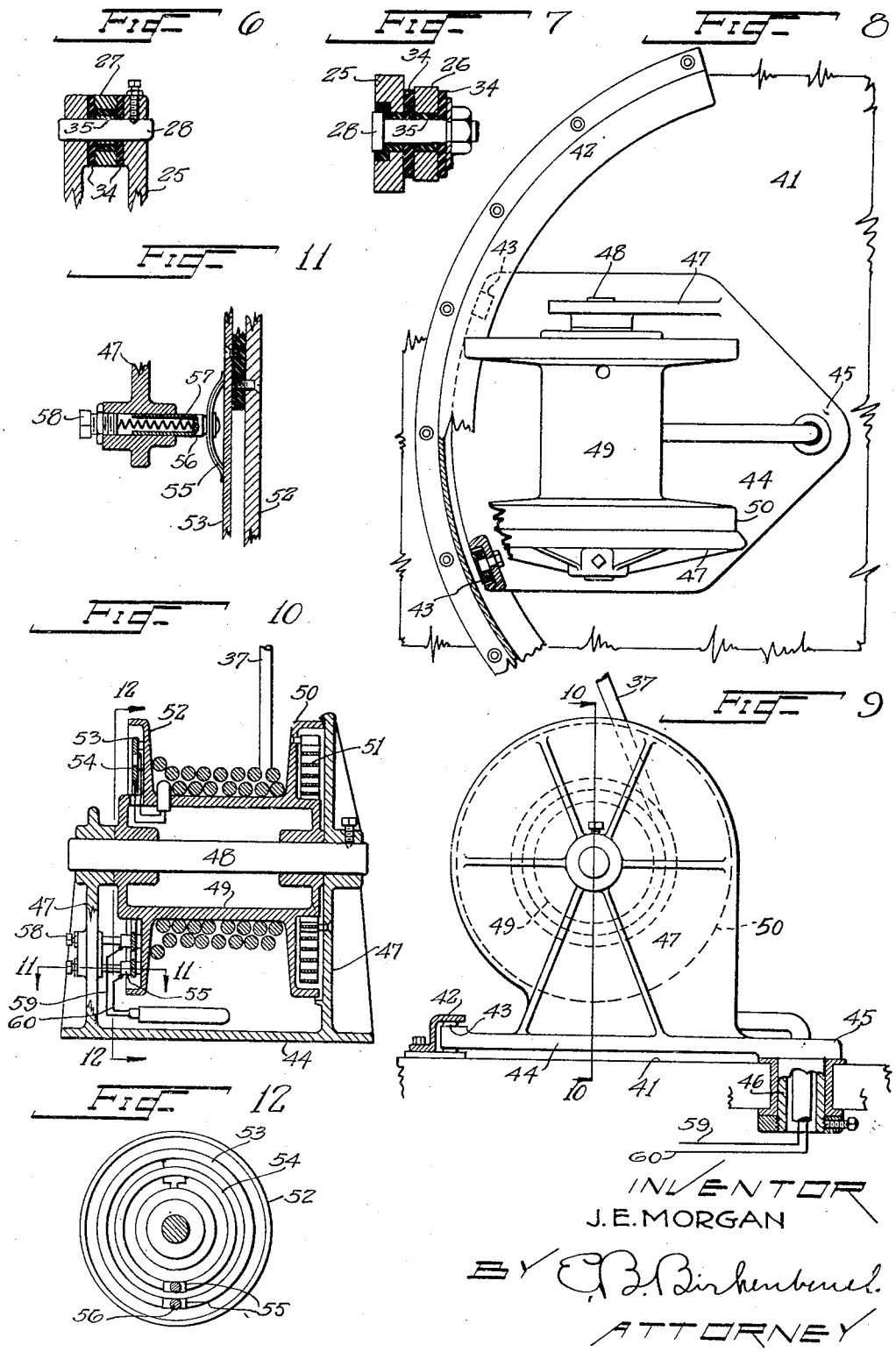

Patented Aug. 4, 1931

1,817,093

UNITED STATES PATENT OFFICE

JAMES E. MORGAN, OF PORTLAND, OREGON

FLEXIBLE TROLLEY

Application filed October 14, 1929. Serial No. 399,494.

This invention relates generally to transportation, and particularly to the electrification of motor busses by the utilization of overhead trolley wire systems.

The main object of this invention is to construct a flexible trolley whereby a motor bus may be electrically propelled from the ordinary street car trolley wire.

The second object is to provide a greater range of flexibility and ease of handling than is possible with the ordinary rigid trolley pole.

The third object is to increase the safety of the traveling public by permitting the motor bus to drive over to the curb for receiving and discharging passengers.

The fourth object is to permit the economical operation of motor busses without subjecting the passengers to the obnoxious fumes of the ordinary internal combustion motor.

The fifth object is to provide a new form of trolley carriage espcially adapted for use in connection with this flexible trolley.

These, and other objects, will become more apparent from the specification following as illustrated in the accompanying drawings, in which:

Figure 1 is a general view showing the device in use.

Figure 2 is a section taken along the line 2—2 in Figure 1.

Figure 3 is an end view of the trolley car showing tilt of wheels when bus moves over to curb.

Figure 4 is a plan view of the trolley carriage.

Figure 5 is a side view of the trolley carriage.

Figure 6 is a section taken along the line 6—6 in Figure 4.

Figure 7 is a section taken along the line 7—7 in Figure 4.

Figure 8 is a plan view of the reel and arcuate guide.

Figure 9 is a side view of the reel.

Figure 10 is a section taken along the line 10—10 in Figure 9.

Figure 11 is a section taken along the line 11—11 in Figure 10.

Figure 12 is a section taken along the line 12—12 in Figure 10.

Similar numbers of reference refer to similar parts throughout the several views.

Referring in detail to the drawings, there is shown the usual form of trolley wire supporting poles 15 between which are the span wires 16 carrying the insulators 17. At an intermediate position is an elongated insulator 18 from which depend the trolley wire supporting arms 19 which support the live wire 20 and the ground wire 21, which must obviously be insulated from each other. The wires 20 and 21 constitute a double track from which branch lines may radiate or cross over through the medium of a switch 22, the details of which are well understood and need not be disclosed here, but are preferably of a character to permit same to be operated by the pull cords 23 and 24.

On the trolley wires 20 and 21 is mounted a carriage including a pair of side frames 25 joined by the transverse end ties 26 and the connecting link 27. The ties 26 and the link 27 are hingedly joined at their ends to the frames 25 by means of the bolts 28. The link 27 is elevated somewhat above the ties 26. Journaling across the ties 26 is a longitudinal rock shaft 29 on which is mounted a sleeve 30 whose upper end 31 is pivotally attached to the link 27 by means of the pin 32.

The wheels 33 are mounted on the sides of the frames 25. It can be seen in Figure 3 that when the sleeve 30 is moved to one side of a vertical position that the wheels 33 will be inclined to the opposite side of the vertical position referred to, the object being to enable the carriage to resist a lateral pull without danger of jumping from the wires 20 and 21. It must be understood that the wheels 33 on one side of the carriage are of a necessity insulated from the wheels 33 on the opposite side of the carriage, this insulation being secured by means of washers 34 and bushings 35.

Secured within the sleeve 30 by means of the clamping bolts 36 is the upper end of a flexible trolley cable 37 whose leads 38 and 39 are secured to their respective frames 25 (as shown in Figure 4).

Turning now to the motor bus 40, which is of the electrically driven variety, it will be seen that there is mounted on its roof 41 an arcuate guiding track 42 upon which ride the rollers 43 of the frame 44 whose end 45 is pivotally attached to the roof 41 by means of a tubular shaft 46. On the frame 44 is mounted a pair of standards 47 which support the shaft 48 of the trolley spool 49 within whose recessed flange 50 is mounted a spring 51, one end of which is fastened to the flange 50 and the other end of which is fastened to the standard 47. On the flange 52 are mounted the circular conductors 53 and 54 on each of which rides a contact brush 55 which is mounted on the tubular slide 56, within which is a spring 57 provided with a tensioning screw 58. From the brushes 55 lead wires 59 and 60 pass downwardly through the shaft 46 to the motor of the bus 40.

It can be seen in the operation of this device that the bus would normally travel under the trolley wires 20 and 21, which could of course be positioned near the right hand curb instead of in the middle of the street as is ordinarily the practice. However, since the trolley wires are often used by street cars as well as busses and the tracks are usually in the center of the street, it is desirable to utilize the trolley wires as they stand and enable the bus to easily run over to the curb whenever it is desired to do so, or to travel in different traffic lanes.

It can be seen by the construction that I have above described that I have produced an exceedingly flexible arrangement of elements wherein the bus is not limited to a position directly under the wires but is enabled to shift its position on the street without danger of the trolley carriage jumping the trolley wire.

I am of course aware that double trolley poles of rigid construction have been used for this purpose, but their operating range is so limited as to render same objectionable, it is therefore not my desire to cover such devices broadly, but I do intend to cover all such forms and modifications thereof as fall within the range of the appended claims.

I claim:

1. The combination of an electrically driven vehicle with an overhead trolley system, a carriage mounted on said trolley system, a flexible trolley between said carriage and vehicle, a spool on said vehicle on which the trolley is wound and a castor mounting for said spool whereby its drum axis may be held normal to the line of pull on said trolley.

2. The combination of a carriage adapted to ride on a double wire trolley system, a flexible trolley connected to said carriage containing two lead wires having a castor base adapted to be mounted on the deck of a bus and a spool on said castor base on which said lead wires are wound, said spool having a spring for urging same in a winding direction.

3. A carriage for flexible trolleys consisting of a vehicle adapted to ride on a double trolley system having its wheels adapted to tilt laterally, a flexible trolley attached to said carriage adapted to be moved to either side of said carriage and having operating connections to said wheels for tilting same in a direction opposite to that in which the trolley is moved.

4. A carriage for flexible trolleys consisting of a pair of longitudinal frame members insulated from each other, cross ties between said frame members permitting said frames to tilt out of vertical planes, a connecting link between said frames above said cross ties for holding said frames in parallelism, a tubular sleeve pivotally mounted between said ties and hinged to said link whereby a lateral swing of said sleeve will swing said frames in unison, and wheels mounted on each of said frames adapted to ride on a pair of spaced trolley wires.

5. In a flexible trolley the combination of a span wire including an elongated insulator having a pair of trolley wire supporting arms depending therefrom, a pair of trolley wires supported on their under side by said arms, a carriage mounted on the top side of said wires, the wheels on one side of said carriage being insulated from the wheels on the opposite side thereof, a duplex flexible cable electrically connected to opposite sides of said carriage and depending therefrom, a spool adapted to be mounted on a motor bus roof upon which said cable is wound, a spring for rotating said spool in a winding direction, annular contact bars on said spool communicating with the ends of said duplex cable, and stationary brushes riding on said contact bars whereby current may be supplied to a motor within the bus.

JAMES E. MORGAN.